United States Patent [19]
Shi et al.

[11] Patent Number: 5,684,658
[45] Date of Patent: Nov. 4, 1997

[54] HIGH TRACK DENSITY DUAL STRIPE MAGNETORESISTIVE (DSMR) HEAD

[75] Inventors: Xizeng Shi, Union City; Yimin Guo, Sunnyvale; Kochan Ju; Cherng-Chyi Han, both of San Jose; Yimin Hsu, Sunnyvale; Jei-Wei Chang, Cupertino, all of Calif.

[73] Assignee: Headway Technologies, Inc., Milpitas, Calif.

[21] Appl. No.: 727,264

[22] Filed: Oct. 7, 1996

[51] Int. Cl.$^6$ ............................................. G11B 5/39
[52] U.S. Cl. .................................................. 360/113
[58] Field of Search ................................... 360/113

[56] References Cited

U.S. PATENT DOCUMENTS

| | | | |
|---|---|---|---|
| 5,084,794 | 1/1992 | Smith | 360/113 |
| 5,309,305 | 5/1994 | Napela et al. | 360/113 |
| 5,357,388 | 10/1994 | Smith | 360/113 |
| 5,442,508 | 8/1995 | Smith | 360/113 |
| 5,508,868 | 4/1996 | Cheng et al. | 360/113 |

OTHER PUBLICATIONS

Nh Yeh, "Asymmetric Crosstalk of Magnetoresistive Head" IEEE Trans. on Magnetics, vol. 18(6), Nov. 1982, pp. 1155–1157.

L. Nix et al., "Micromagnetic Track Profile Asymmetrics in Dual Magnetoresistive Heads" IEEE Transon Magnetics, vol. 27(6), Nov. 1991 pp. 4693–4697.

J.G. Zhu et al "Recording Limitations for Saumr Dual–Stripe and sph Value Heads" Intermag 1996 Proceedings, Session E8–08, Seattle (1996) no month.

Primary Examiner—John H. Wolff
Attorney, Agent, or Firm—George O. Saile; Stephen B. Ackerman; Alek P. Szecsy

[57] ABSTRACT

A method for forming a dual stripe magnetoresistive (DSMR) sensor element, and the dual stripe magnetoresistive (DSMR) sensor element formed through the method. To practice the method, there is formed upon a substrate a first magnetoresistive (MR) layer, where the first magnetoresistive (MR) layer has a first sensor region longitudinally magnetically biased in a first longitudinal bias direction through a patterned first longitudinal magnetic biasing layer. There is then formed a second magnetoresistive (MR) layer parallel with and separated from the first magnetoresistive (MR) layer by an insulator layer. The second magnetoresistive (MR) layer has a second sensor region longitudinally magnetically biased in a second longitudinal bias direction through a patterned second longitudinal magnetic biasing layer. The first longitudinal bias direction and the second longitudinal bias direction are substantially parallel. In addition, the first sensor region and the second sensor region are physically offset. Finally, the first magnetoresistive (MR) layer is electromagnetically biased with a first bias current in a first bias current direction and the second magnetoresistive (MR) layer is electromagnetically biased with a second bias current in a second bias current direction, where the first bias current direction and the second bias current direction are substantially parallel.

16 Claims, 5 Drawing Sheets

HIGH TRACK DENSITY DUAL STRIPE MAGNETORESISTIVE (DSMR) HEAD

BACKGROUND OF THE INVENTION

1. Field of the Invention

The present invention relates generally to magnetoresistive (MR) sensor elements employed in magnetoresistive (MR) read-write heads for magnetic data storage and retrieval. More particularly, the present invention relates to narrow read back width dual stripe magnetoresistive (DSMR) sensor elements employed in narrow read back width dual stripe magnetoresistive (DSMR) read-write heads for magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in storage density of direct access storage devices (DASDs) employed in digitally encoded magnetic data storage and retrieval. Storage density of direct access storage devices (DASDs) is typically measured as areal storage density of a magnetic data storage medium formed upon a rotating magnetic data storage disk within a direct access storage device (DASD) enclosure. The areal storage density is defined largely by the track width, the track spacing and the linear magnetic domain density within the magnetic data storage medium. The track width, the track spacing and the linear magnetic domain density are in turn determined by several principal factors, including but not limited to: (1) the magnetic read-write characteristics of a magnetic read-write head employed in reading and writing digitally encoded magnetic data into and from the magnetic data storage medium; (2) the magnetic domain characteristics of the magnetic data storage medium which is formed upon the rotating magnetic data storage disk; and (3) the separation distance of the magnetic read-write head from the rotating magnetic data storage disk.

With regard to magnetic read-write heads employed in reading and writing digitally encoded magnetic data into and from a magnetic data storage disk, it has become common in the art to employ magnetoresistive (MR) sensor elements as read elements within those magnetic read-write heads since magnetoresistive (MR) sensor elements provide high output digital signals, with good linear resolution, independent of the relative velocity of a magnetic data storage medium with respect to the magnetoresistive (MR) sensor element. Although magnetoresistive (MR) read-write heads have thus become quite common in reading and writing digitally encoded magnetic data into and from magnetic data storage media, magnetoresistive (MR) read-write heads are not entirely without problems. In particular, it is known in the art that single stripe magnetoresistive (MR) read-write heads exhibit an asymmetric crosstalk from data tracks adjoining a target data track from which digitally encoded magnetic data is desired to be read, thus requiting increased data track separation within a magnetic data storage medium. See generally, N. H. Yeh, "Asymmetric Crosstalk of Magnetoresistive Head," IEEE Trans. on Magnetics, Vol. 18(6), November 1982, pp. 1155–57.

While performance of single stripe magnetoresistive (MR) read-write heads may be improved and the read track asymmetry within single stripe magnetoresistive (MR) heads may be reduced by employing two magnetoresistive (MR) layers to form a dual stripe magnetoresistive (DSMR) sensor element within a dual gripe magnetoresistive (DSMR) read-write head, such enhanced performance and symmetry often still come at the expense of magnetic data track spacing. See generally: (1) L. Nix et al., "Micromagnetic Track Profile Asymmetries in Dual Magnetoresistive Heads," IEEE Trans. on Magnetics, Vol. 27(6), November 1991, pp. 4693–97; and (2) J. G. Zhu et al., "Recording Limitations for SAL/MR Dual-Stripe and Spin Valve Heads," INTERMAG 1996 Proceedings, Session EB-08, Seattle (1996).

It is therefore desirable in the an to provide dual stripe magnetoresistive (DSMR) sensor elements for use within dual stripe magnetoresistive (DSMR) read-write heads, where the dual stripe magnetoresistive (DSMR) sensor elements are fabricated in a fashion such that the enhanced performance of a dual stripe magnetoresistive (DSMR) read-write head may be realized while simultaneously providing a dual stripe magnetoresistive (DSIVIR) read-write head with a controlled, preferably reduced, read back width. It is towards that goal that the present invention is directed.

Beyond the foregoing references, additional novel configurations of dual stripe magnetoresistive (DSMR) sensor elements for use within dual stripe magnetoresistive (DSMR) read-write heads are known in the art. For example, Nepela et al. in U.S. Pat. No. 5,309,305 discloses a dual stripe magnetoresistive (DSMR) sensor element with longitudinally magnetically biased magnetoresistive (MR) layers in anti-parallel directions. When biasing each of the magnetoresistive (MR) layers with an anti-parallel biasing current in a range substantially higher than conventionally employed within dual stripe magnetoresistive (DSMR) sensor elements, there is formed a dual stripe magnetoresistive (DSMR) sensor element with increased output amplitude and improved signal to noise ratio.

Desirable in the art are additional novel dual stripe magnetoresistive (DSMR) sensor elements. Particularly desirable are additional novel dual stripe magnetoresistive (DSMR) sensor elements which exhibit controlled, preferably reduced, read back widths.

SUMMARY OF THE INVENTION

A first object of the present invention is to provide a dual stripe magnetoresistive (MR) sensor element for use within a dual stripe magnetoresistive (DSMR) read-write head.

A second object of the present invention is to provide a dual stripe magnetoresistive (DSMR) sensor element in accord with the first object of the present invention, where the dual stripe magnetoresistive (DSMR) sensor element has a controlled, preferably reduced, read back width.

A third object of the present invention is to provide a dual stripe magnetoresistive (DSMR) sensor element in accord with the first object of the present invention or the second object-of the present invention, where the method through which is formed the dual stripe magnetoresistive (MR) sensor element is readily manufacturable.

In accord with the foregoing objects, there is provided by the present invention a dual stripe magnetoresistive (DSMR) sensor element exhibiting a controlled, preferably reduced, read back width, and a method for forming the dual stripe magnetoresistive (DSMR) sensor element. To practice the method, there is formed upon a substrate a first magnetoresistive (MR) layer, where the first magnetoresistive (MR) layer has a first sensor region longitudinally magnetically biased in a first longitudinal bias direction through a patterned first longitudinal magnetic biasing layer in contact with the first magnetoresistive (MR) layer. There is then formed a second magnetoresistive (MR) layer parallel with and separated from the first magnetoresistive (MR) layer by an insulator layer. The second magnetoresistive (MR) layer has a second sensor region longitudinally magnetically biased in a second longitudinal bias direction through a second longitudinal magnetic biasing layer in contact with the second magnetoresistive (MR) layer. The first longitudinal bias direction and the second longitudinal bias direction are substantially parallel. In addition, the first sensor region and the second sensor region are overlapped but physically offset. Finally, the first magnetoresistive layer is electromagnetically biased with a first bias current in a first bias current direction and the second magnetoresistive layer is electromagnetically biased with a second bias current in a second bias current direction, where the first bias current direction and the second bias current direction are also substantially parallel.

Through the present invention, there is provided a dual stripe magnetoresistive (DSMR) sensor element for use within a dual stripe magnetoresistive (DSMR) read-write head, where the dual stripe magnetoresistive (DSMR) sensor element may be formed with a controlled, preferably reduced, read back width. Although the physical mechanism through which the read back width of the dual stripe magnetoresistive (DSMR) sensor element formed through the method of the present invention is controlled is not entirely well understood, it is nonetheless clear that a dual stripe magnetoresistive (DSMR) sensor element formed through the method of the present invention, where: (1) the first sensor region within the first magnetoresistive (MR) layer and the second sensor region within the second magnetoresistive (MR) layer are overlapped but physically offset; (2) the first sensor region within the first magnetoresistive (MR) layer is longitudinally magnetically biased in a first longitudinal bias direction and the second sensor region within the second magnetoresistive (MR) layer is longitudinally magnetically biased in a second longitudinal bias direction, where the first longitudinal bias direction and the second longitudinal bias direction are substantially parallel; and (3) the first magnetoresistive (MR) layer is electromagnetically biased with a first bias current having a first bias current direction and the second magnetoresistive (MR) layer is electromagnetically biased with a second bias current having a second bias current direction, where the first bias current direction and the second bias current direction are also substantially parallel, exhibits a controlled read back width. When the first bias current direction and the second bias current direction are substantially parallel with the first longitudinal bias direction and the second longitudinal bias direction, the read back width is decreased with respect to the first sensor region width and the second sensor region width. When the first bias current direction and the second bias current direction are substantially anti-parallel with the first longitudinal bias direction and the second longitudinal bias direction, the read back width is increased with respect to the first sensor region width and the second sensor region width.

The method through which is formed the dual stripe magnetoresistive (MR) sensor element of the present invention is readily manufacturable. The dual stripe magnetoresistive (DSMR) sensor element of the present invention is formed through: (1) an overlap and physical offset of the two sensor regions of two magnetoresistive (MR) layers formed through methods and materials which are otherwise conventional in the art of dual stripe magnetoresistive (DSMR) sensor element fabrication; (2) a substantially parallel longitudinal magnetic bias direction of the two magnetoresistive (MR) layers; and (3) a substantially parallel electromagnetic bias current direction of the two magnetoresistive layers (MR) layers. Each of the foregoing limitations in the method for forming the dual stripe magnetoresistive (DSMR) sensor element of the present invention is readily achieved through methods and structures as are conventional in the art. Thus, the method through which is formed the dual stripe magnetoresistive (DSMR) sensor element of the present invention is readily manufacturable.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a dual stripe magnetoresistive (DSMR) sensor element for use within a dual stripe magnetoresistive (MR) read-write head, and a method for forming the dual stripe magnetoresistive (DSMR) sensor element, where the dual stripe magnetoresistive (DSMR) sensor element is formed with a controlled, preferably reduced, read back width. To accomplish this goal, the dual stripe magnetoresistive (DSMR) sensor element is formed with a first magnetoresistive (MR) layer having a first sensor region separated from a second magnetoresistive (MR) layer having a second sensor region by an insulator layer. The first sensor region and the second sensor region overlap but are physically offset. In addition, the first sensor region is longitudinally magnetically biased in a first longitudinal direction and the second sensor region is longitudinally magnetically biased in a second longitudinal direction, where the first longitudinal direction and the second longitudinal direction are substantially parallel. Finally, the first sensor region is electromagnetically biased with a first bias current having a first bias current direction and the second sensor region is electromagnetically biased with a second bias current having a second bias current direction, where the first bias current direction and the second bias current direction are also substantially parallel. When the first bias current direction and the second bias current direction are substantially parallel with the first longitudinal bias direction and the second longitudinal bias direction, the read back width of the dual stripe magnetoresistive (DSMR) sensor element is decreased with respect to the first sensor region width and the second sensor region width. When the first bias current direction and the second bias current direction are substantially anti-parallel to the first longitudinal bias direction and the second longitudinal bias direction, the read back width of the dual stripe magnetoresistive (DSMR) sensor element is increased in comparison with the first sensor region width and the second sensor region width.

Figure 1:
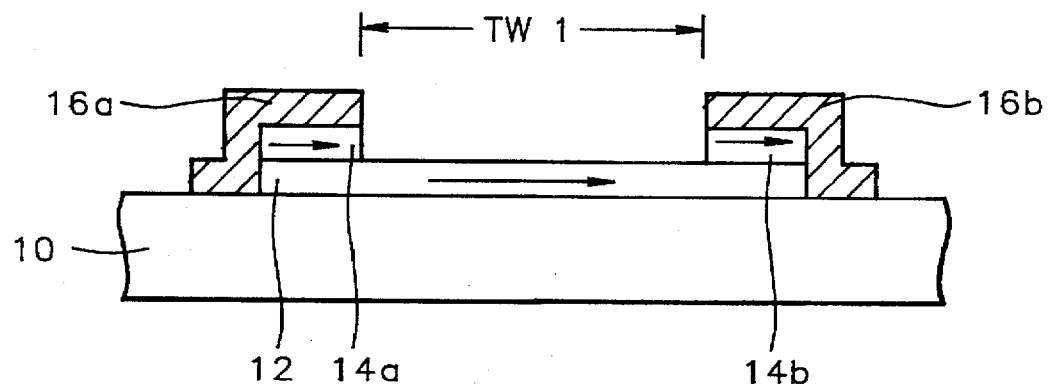
FIG. 1, FIG. 2, FIG. 3a and FIG. 3b show a series of schematic plan-view diagrams illustrating the results of progressive stages in forming a dual stripe magnetoresistive (DSMR) sensor element through the preferred embodiment of the method of the present invention, where a second sensor region within a second magnetoresistive (MR) layer has a positive offset with respect to a first sensor region within a first magnetoresistive (MR) layer.

Referring now to FIG. 1 to FIG. 3b, there is shown a series of schematic plan-view diagrams illustrating the results of progressive stages in forming a dual stripe magnetoresistive (DSMR) sensor element through the preferred embodiment of the method of the present invention. Shown in FIG. 1 is a schematic plan-view diagram of the dual stripe magnetoresistive sensor element at an early stage in its fabrication.

Shown in FIG. 1 is a substrate 10 having formed thereupon a patterned first magnetoresistive (MR) layer 12. Substrates upon which, in general, may be formed magnetoresistive (MR) sensor elements and upon which in particular may be formed the dual stripe magnetoresistive (DSMR) sensor element of the present invention are known in the arts of magnetoresistive (MR) sensor element fabrication and dual stripe magnetoresistive (DSMR) sensor element fabrication. Typically and preferably, the substrate 10 is a non-magnetic inorganic substrate which is either subsequently diced and laminated in forming a slider assembly which is employed within a direct access storage device (DASD) magnetic data storage enclosure or subsequently diced and machined in forming a slider assembly which is employed within a direct access storage device (DASD) magnetic data storage enclosure.

In addition, patterned magnetoresistive (MR) layers which may be employed in forming magnetoresistive (MR) sensor elements are also in general known in the art of magnetoresistive (MR) sensor element fabrication. Typically and preferably, although not exclusively, such patterned magnetoresistive (MR) layers are formed from a permalloy (ie: nickel-iron; 80:20 w/w) magnetoresistive (MR) alloy material formed upon a substrate at a thickness of from about 50 to about 500 angstroms. The patterned magnetoresistive (MR) layers of permalloy magnetoresistive (MR) alloy material so formed may be deposited through any of several methods as are known in the art, including but not limited to thermally assisted evaporation methods, electron beam assisted evaporation methods and physical vapor deposition (PVD) sputtering methods. For the preferred embodiment the present invention, the patterned first magnetoresistive (MR) layer 12 is preferably formed of a permalloy (ie: nickel-iron; 80:20 w/w) magnetoresistive (MR) alloy material at a thickness of from about 50 to about 500 angstroms. In addition to the thickness of from about 50 to about 500 angstroms, the patterned first magnetoresistive (MR) layer 12 of the permalloy magnetoresistive (MR) alloy material also preferably has a width upon the substrate 10 of from about 0.5 to about 100 microns and a length (not shown) upon the substrate 10 of from about 0.5 to about 10 microns.

Also shown in FIG. 1 is a pair of patterned first anti-ferromagnetic longitudinal magnetic biasing layers 14a and 14b formed upon the patterned first magnetoresistive (MR) layer 12. In turn, there is further shown in FIG. 1 formed upon the pair of patterned first anti-ferromagnetic longitudinal magnetic biasing layers 14a and 14b a pair of patterned first conductor lead layers 16a and 16b. Each of the patterned first conductor lead layers 16a and 16b conformally bridges to the substrate 10. Methods and materials through which patterned anti-ferromagnetic longitudinal magnetic biasing layers and patterned conductor lead layers may be formed within magnetoresistive (MR) sensor elements are known in the an of magnetoresistive (MR) sensor element fabrication. Methods through which patterned anti-ferromagnetic longitudinal magnetic biasing layers and patterned conductor lead layers may be formed within magnetoresistive (MR) sensor elements include but are not limited to thermally assisted evaporation methods, electron beam assisted evaporation methods and physical vapor deposition (PVD) sputtering methods. Anti-ferromagnetic materials through which patterned anti-ferromagnetic longitudinal magnetic biasing layers are formed within magnetoresistive (MR) sensor elements typically, although not exclusively, include nickel-manganese, iron-manganese (50:50), nickel oxide, cobalt oxide and other anti-ferromagnetic materials. Materials through which patterned conductor lead layers are formed within magnetoresistive (MR) sensor elements typically, although not exclusively, include conductor materials including but not limited to aluminum, gold, copper and/or silver containing conductor materials, plus alloys of aluminum, gold, copper and/or silver containing conductor materials.

For the preferred embodiment of the present invention, the patterned first anti-ferromagnetic longitudinal magnetic biasing layers 14a and 14b are preferably formed of a nickel-manganese anti-ferromagnetic material, as is common in the art. However, other hard magnetic materials, such as but not limited to cobalt-chromium binary, ternary and higher order alloys (ie: CoCr, CoCrPt, CoCrTa, CoCrNi, CoCrPtNi, CoCrNiTa, etc.) may also be employed. Preferably, the patterned first anti-ferromagnetic longitudinal magnetic biasing layers 14a and 14b are formed upon the patterned first magnetoresistive (MR) layer 12 to a thickness of from about 50 to about 1000 angstroms each while simultaneously providing a longitudinal magnetic exchange bias field of from about 10 to about 1000 oersteds. More preferably, the longitudinal magnetic exchange bias field is from about 15 to about 100 oersteds. Similarly, for the preferred embodiment of the present invention, the patterned first conductor lead layers 16a and 16b are preferably formed conformally upon the corresponding patterned first anti-ferromagnetic longitudinal magnetic biasing layer 14a or 14b, and bridging to the substrate 10, from an aluminum, gold, copper or silver containing conductor material, or an alloy of an aluminum, gold, copper or silver containing conductor material. Preferably, the patterned first conductor lead layers 16a and 16b are formed to a thickness of from about 100 to about 1000 angstroms each.

As is illustrated in FIG. 1, the patterned first anti-ferromagnetic longitudinal magnetic biasing layers 14a and 14b, and the first patterned conductor lead layers 16a and 16b, define a first track width TW1 of the patterned first magnetoresistive (MR) layer 12. Preferably, the first track-width TW1 is from about 0.3 to about 5 microns in width. More preferably, the first track width TW1 is from about 0.5 to about 3 microns in width. Although it has not specifically been investigated, it is believed that the present invention provides a dual stripe magnetoresistive (DSMR) sensor element of superior performance when there is employed the patterned first anti-ferromagnetic longitudinal magnetic biasing layers 14a and 14b rather than a single adjacent magnetic biasing layer completely contiguous with the patterned first magnetoresistive (MR) layer 12, as is also known in the art.

As is also illustrated in FIG. 1, the patterned first anti-ferromagnetic longitudinal magnetic biasing layers 14a and 14b longitudinally magnetically bias the patterned first magnetoresistive (MR) layer 12 from left to right. However, a functionally equivalent dual stripe magnetoresistive (DSMR) sensor element may also be formed through the method of the present invention when the patterned first anti-ferromagnetic longitudinal magnetic biasing layers 14a and 14b longitudinally magnetically bias the patterned first magnetoresistive (MR) layer 12 from the right to the left. Preferably and conventionally, the patterned first anti-ferromagnetic longitudinal magnetic biasing layers 14a and 14b are formed through either: (1) a magnetically enhanced deposition method incorporating an extrinsic magnetic bias which provides the longitudinal magnetic bias to the patterned first anti-ferromagnetic longitudinal magnetic biasing layers 14a and 14b; or (2) an annealing method where the patterned first anti-ferromagnetic biasing layers 14a and 14b are annealed within an extrinsic magnetic bias to provide the longitudinal magnetic bias to the patterned first anti-ferromagnetic longitudinal biasing layers 14a and 14b.

Figure 2:
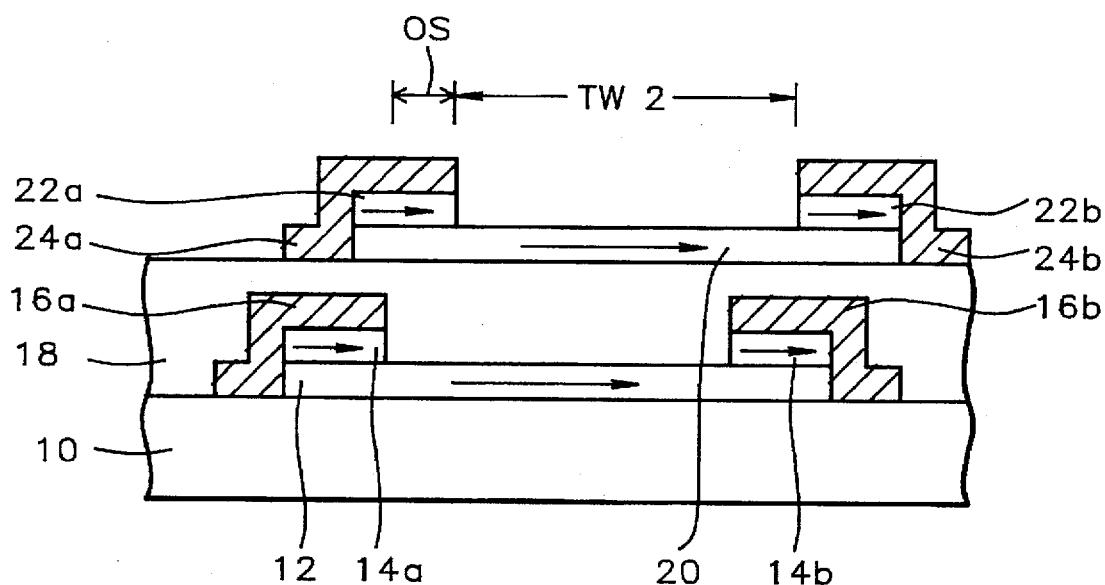

Referring now to FIG. 2, there is shown a schematic plan-view diagram illustrating the results of further processing of the dual stripe magnetoresistive (DSMR) sensor element whose schematic plan-view diagram is illustrated in FIG. 1. Shown in FIG. 2 is a first insulator layer 18 which separates a patterned second magnetoresistive (MR) layer 20 from the structure whose schematic plan-view diagram is illustrated in FIG. 1. Methods and materials through which insulator layers may be formed to separate patterned magnetoresistive (MR) layers within dual stripe magnetoresistive (DSMR) sensor elements are known in the art of dual stripe magnetoresistive (DSMR) sensor element fabrication. Methods and materials through which insulator layers are formed to separate patterned magnetoresistive (MR) layers within dual stripe magnetoresistive (DSMR) sensor elements typically include chemical vapor deposition (CVD) methods, plasma enhanced chemical vapor deposition (PECVD) methods and physical vapor deposition (PVD) sputtering methods through which are formed insulator layers of insulator materials including but not limited to silicon oxide insulator materials, silicon nitride insulator materials and aluminum oxide insulator materials. For the preferred embodiment of the present invention, the first insulator layer 18 is preferably formed of an aluminum oxide insulator material through methods as are conventional in the art. Preferably, the first insulator layer 18 provides a separation of the patterned first magnetoresistive (MR) layer 12 from the patterned second magnetoresistive (MR) layer 20 of from about 100 to about 1000 angstroms.

There is also shown in FIG. 2 the patterned second magnetoresistive (MR) layer 20 having formed thereupon a pair of patterned second anti-ferromagnetic longitudinal magnetic biasing layers 22a and 22b which in turn have formed thereupon a pair of patterned second conductor lead layers 24a and 24b. The pair of patterned second conductor lead layers 24a and 24b bridges conformally to the first insulator layer 18. The patterned second magnetoresistive (MR) layer 20 is preferably formed through methods, materials and dimensions equivalent to the methods, materials and dimensions employed in forming the patterned first magnetoresistive (MR) layer 12. The pair of patterned second anti-ferromagnetic longitudinal magnetic biasing layers 22a and 22b is preferably formed through methods, materials and dimensions equivalent to the methods, materials and dimensions employed in forming the pair of patterned first anti-ferromagnetic longitudinal magnetic biasing layers 14a and 14b. Finally, the pair of patterned second conductor lead layers 24a and 24b is preferably formed through methods, materials and dimensions equivalent to the methods, materials and dimensions employed in forming the pair of patterned first conductor lead layers 16a and 16b. Significant to the dual stripe magnetoresistive (DSMR) sensor element formed through the preferred embodiment of the method of the present invention is that the second longitudinal magnetic bias direction of the patterned second magnetoresistive (MR) layer 20 is substantially parallel to the first longitudinal magnetic bias direction of the patterned first magnetoresistive (MR) layer 12 (within the context of the methods employed in providing the first longitudinal magnetic bias and the second longitudinal magnetic bias). In that regard, the patterned first magnetoresistive layer 12 and the patterned second magnetoresistive layer 20 may both have a longitudinal magnetic bias direction from left to right as illustrated in FIG. 2, or they may both have a longitudinal magnetic bias direction from right to left (not illustrated). Similarly with the method through which the longitudinal magnetic bias is provided to the patterned first magnetoresistive (MR) layer 12 by forming the patterned first anti-ferromagnetic longitudinal magnetic biasing layers 14a and 14b within a magnetically assisted deposition method which incorporates a magnetic field bias or annealing the patterned first anti-ferromagnetic longitudinal magnetic biasing layers 14a and 14b within a magnetic field bias, the patterned second anti-ferromagnetic longitudinal magnetic biasing layers 22a and 22b are similarly formed within an equivalent magnetically assisted deposition method which provides a substantially parallel magnetic field biasing between the patterned first anti-ferromagnetic longitudinal magnetic biasing layers 14a and 14b and the patterned second anti-ferromagnetic longitudinal magnetic biasing layers 22a and 22b, or similarly annealing the patterned second anti-ferromagnetic longitudinal magnetic biasing layers 22a and 22b within an appropriate magnetic bias field to provide the substantially parallel magnetic field biasing.

Similarly with the patterned first magnetoresistive (MR) layer 12, the patterned second magnetoresistive (MR) layer 20 also has a second track width TW2 defined by the separation of the patterned second anti-ferromagnetic longitudinal magnetic biasing layers 22a and 22b, and the patterned second conductor lead layers 24a and 24b. Similarly, with the patterned first magnetoresistive layer 12, the second track width TW2 of the patterned second magnetoresistive layer 20 is also preferably from about 0.3 to about 5 microns in width. More preferably, the second track width TW2 is from about 0.5 to about 3 microns in width. Most preferably, the first trackwidth TW1 and the second trackwidth TW2 are equivalent at a width in the range of from about 0.5 to about 3 microns. As is also shown in FIG. 2, the second trackwidth TW2 is offset by a distance OS with respect to the first trackwidth TW1. Although FIG. 2 illustrates the second trackwidth TW2 offset to the right of the first trackwidth TW1, a functionally equivalent dual stripe magnetoresistive (MR) sensor element is also formed through the method of the present invention when the second trackwidth TW2 is offset to the left of the first trackwidth TW1. Preferably, distance of the offset OS is from about 0.1 to about 2.0 microns. More preferably, the distance of the offset OS is from about 0.1 to about 1.0 microns.

Figure 3A:
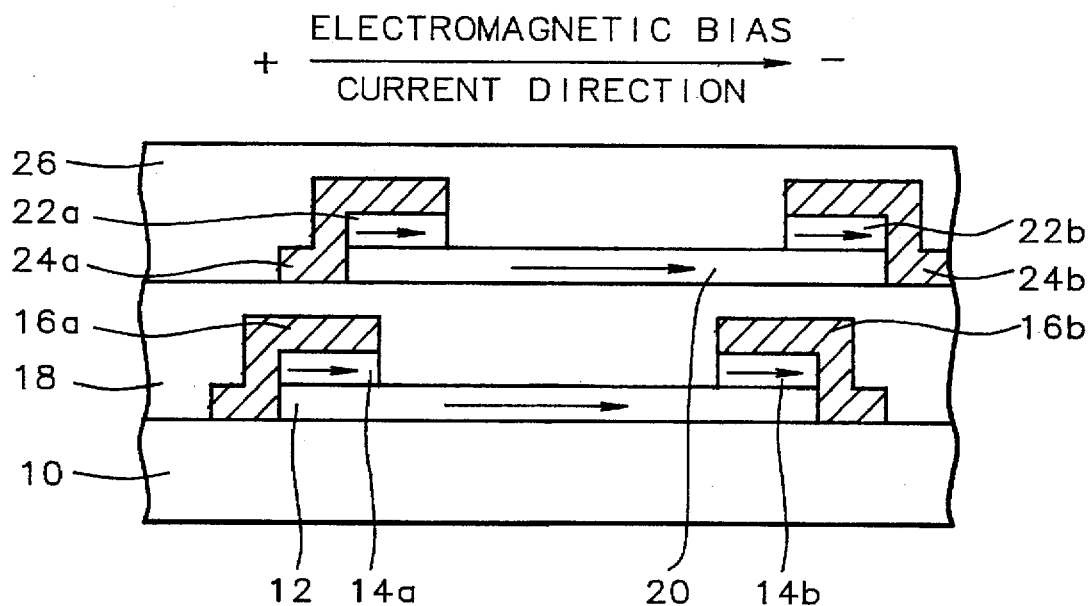
Figure 3B:
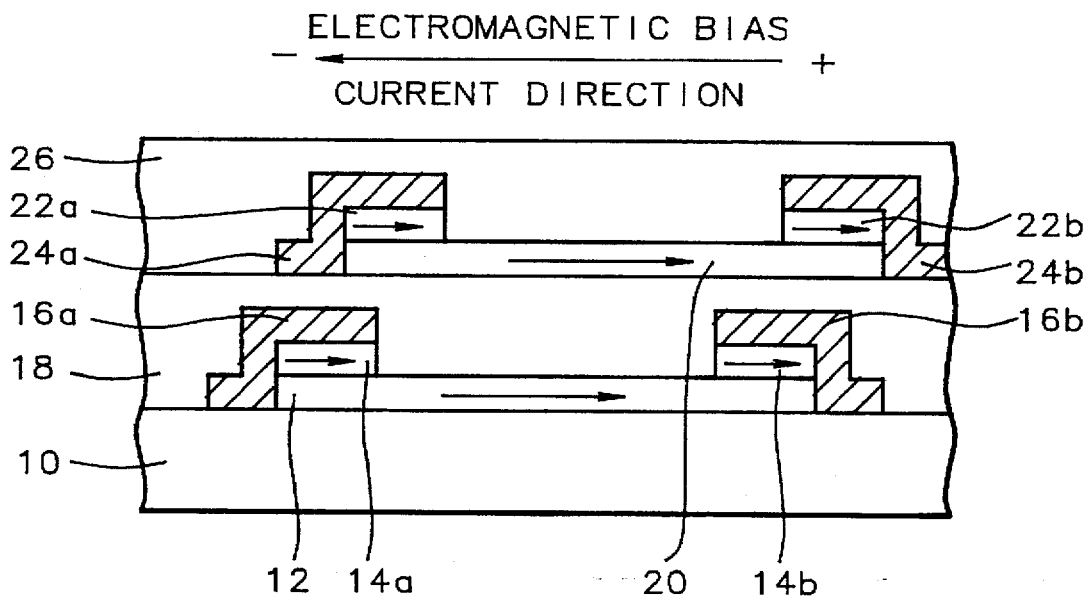

Referring now to FIG. 3a and FIG. 3b there is shown a pair of schematic plan view diagrams illustrating the results of further processing of the dual stripe magnetoresistive (DSMR) sensor element whose schematic plan-view diagram is illustrated in FIG. 2. Shown in both FIG. 3a and FIG. 3b is the presence of a second insulator layer 26 formed upon the dual stripe magnetoresistive (DSMR) sensor element whose schematic plan-view diagram is illustrated in FIG. 2. The second insulator layer 26 is preferably formed through methods, materials and dimensions analogous or equivalent to the methods, materials and dimensions employed in forming the first insulator layer 18.

Also shown in FIG. 3a and FIG. 3b is the electromagnetic bias current direction within the dual stripe magnetoresistive (DSMR) sensor element of the present invention. As shown in FIG. 3a, the electromagnetic bias current direction is parallel with the first longitudinal magnetic bias direction of the patterned first magnetoresistive layer 12 and the second longitudinal magnetic bias direction of the patterned second magnetoresistive layer 20. As is shown in FIG. 3b, the electromagnetic bias current direction is anti-parallel with the first longitudinal magnetic bias direction of the patterned first magnetoresistive layer 12 and the second longitudinal magnetic bias direction of patterned second magnetoresistive layer 20. Although not specifically illustrated in FIG. 3a or FIG. 3b, the electromagnetic bias current direction is applied to provide both: (1) a first bias current within the patterned first magnetoresistive layer 12; and (2) a second bias current within the patterned second magnetoresistive layer 20, where the first bias current is preferably from about 2 to about 20 milli-amperes and the second bias current is also preferably from about 2 to about 20 milli-amperes. More preferably, the first bias current is equal to the second bias current and both the first bias current and the second bias current are in the range of from about 2 to about 20 milli-amperes. As will be seen from the EXAMPLE which follows, by simultaneously anti-ferromagnetically longitudinally magnetically biasing the patterned first magnetoresistive layer 12 and the patterned second magnetoresistive layer 20 in a direction substantially parallel and providing an electromagnetic bias current direction to both the patterned first magnetoresistive layer 12 and the patterned second magnetoresistive layer 20 either substantially parallel or substantially anti-parallel to the longitudinal magnetic bias direction, there is formed a dual stripe magnetoresistive (DSMR) sensor element with a variable read back width in comparison with the first track width TW1 and the second track width TW2. The mechanism through which these variations in read back width occur is not entirely well understood.

Figure 4A:
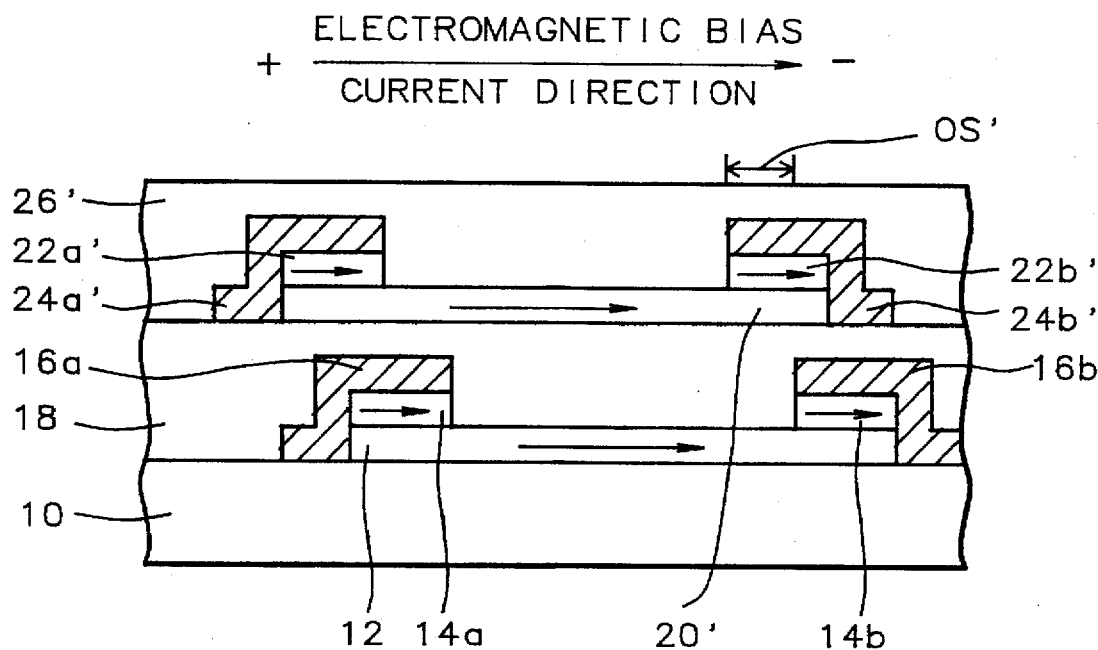
FIG. 4a and FIG. 4b show a pair of schematic plan-view diagrams otherwise equivalent to the pair of schematic plan-view diagrams of FIG. 3a and FIG. 3b, but where a second sensor region within a second magnetoresistive (MR) layer has a negative offset with respect to a first sensor region within a first magnetoresistive (MR) layer.
Figure 4B:
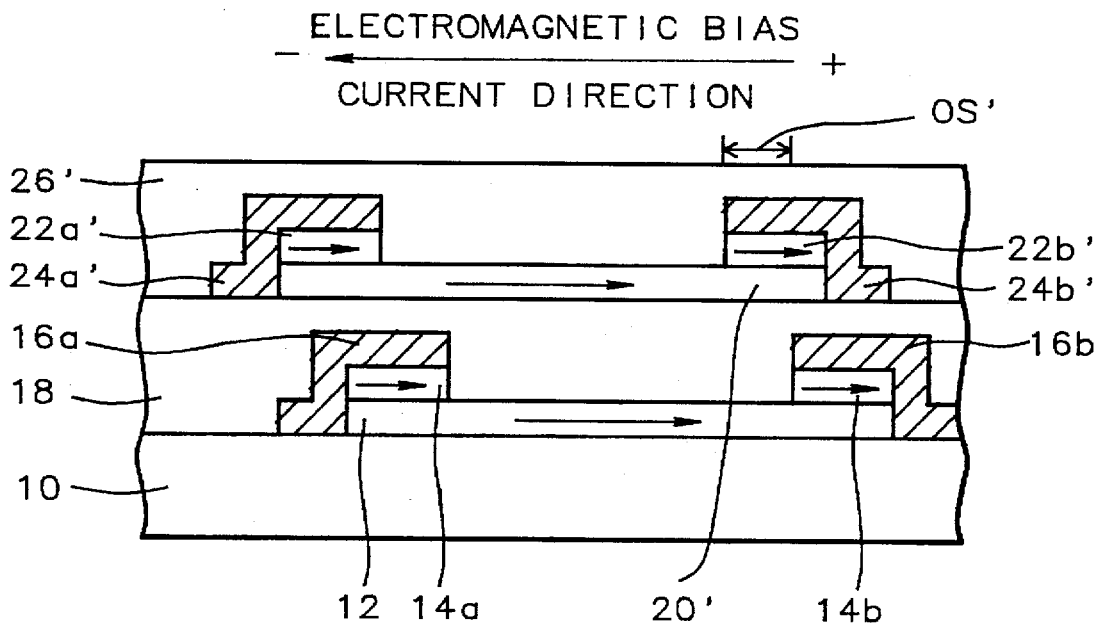

Referring now to FIG. 4a and FIG. 4b, there is shown a pair of schematic plan-view diagrams of an additional dual stripe magnetoresistive (DSMR) sensor element formed in accord with the preferred embodiment of the present invention. The dual stripe magnetoresistive (DSMR) sensor elements whose schematic plan-view diagrams are shown in FIG. 4a and FIG. 4b are otherwise equivalent to the dual stripe magnetoresistive (DSMR) sensor elements whose schematic plan-view diagrams are shown in FIG. 3a and FIG. 3b, with the exception that a patterned second magnetoresistive (MR) layer 20', a pair of patterned second anti-ferromagnetic longitudinal magnetic biasing layers 22a' and 22b' and a pair of patterned second conductor lead layers 24a' and 24b' formed beneath a second insulator layer 26' have an offset OS' in a direction reverse from the offset OS of the patterned second magnetoresistive (MR) layer 20, the pair of patterned second anti-ferromagnetic longitudinal magnetic biasing layers 22a and 22b and the pair of patterned second conductor lead layers 24a and 24b as illustrated in FIG. 3a and FIG. 3b. While the dual stripe magnetoresistive (DSMR) sensor element whose schematic plan-view diagram is illustrated in FIG. 4a or FIG. 4b is functionally equivalent to the dual stripe magnetoresistive (DSMR) sensor element whose schematic plan view diagram is, respectively, illustrated in FIG. 3a or FIG. 3b, normalized electromagnetic response characteristics of the dual stripe magnetoresistive (DSMR) sensor element whose schematic plan-view diagram is illustrated in FIG. 4a will typically mirror the equivalent normalized electromagnetic response characteristics of the dual stripe magnetoresistive (DSMR) sensor element whose schematic cross-sectional diagram is illustrated in FIG. 3a and the normalized electromagnetic response characteristics of the dual stripe magnetoresistive (DSMR) sensor element whose schematic plan-view diagram is illustrated in FIG. 4b will typically mirror the equivalent normalized electromagnetic response characteristics of the dual stripe magnetoresistive (DSMR) sensor element whose schematic plan-view diagram is illustrated in FIG. 3b.

Figure 5:
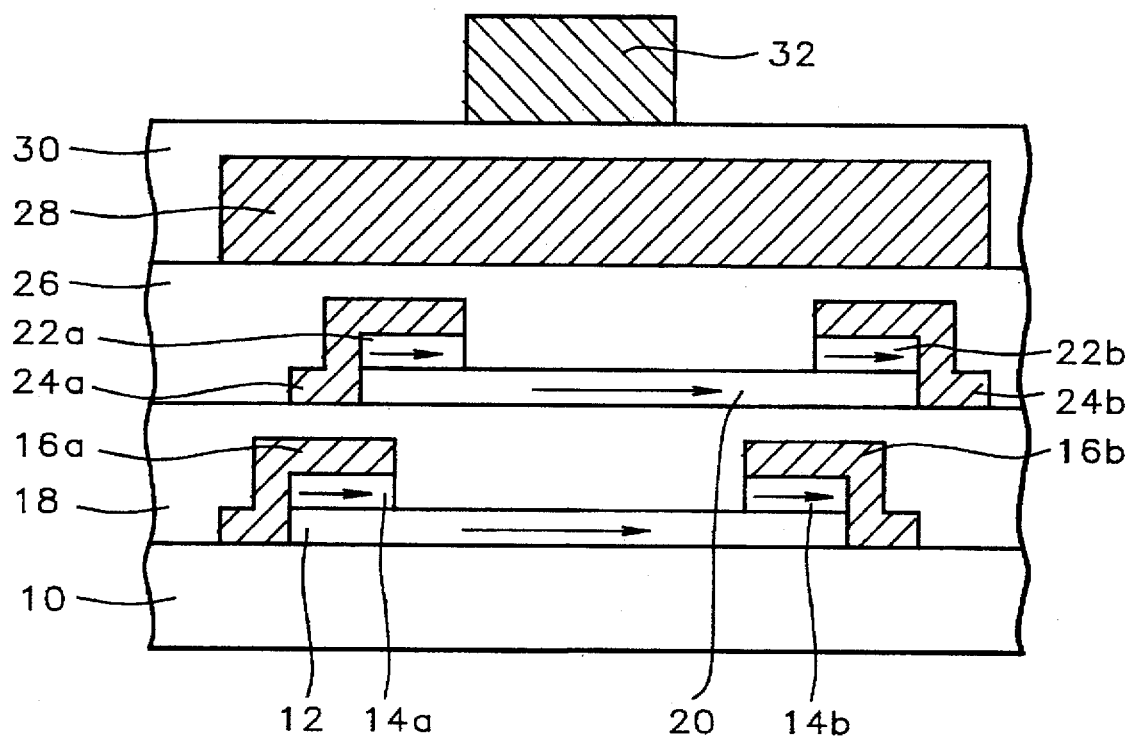
FIG. 5 shows a schematic plan-view diagram of the air bearing surface (ABS) of a dual stripe magnetoresistive (DSMR) read-write head having formed therein the dual stripe magnetoresistive (DSMR.) sensor element of FIG. 3a or FIG. 3b.

Referring now to FIG. 5, there is shown a schematic plan-view diagram illustrating the results of further processing of the dual stripe magnetoresistive (DSMR) sensor element whose schematic plan-view diagram is illustrated in FIG. 3a and FIG. 3b. Shown in FIG. 5 is a schematic plan-view diagram of a dual stripe magnetoresistive (DSMR) sensor element otherwise equivalent to the dual-stripe magnetoresistive (DSMR) sensor element whose schematic plan-view diagram is illustrated in FIG. 3a and FIG. 3b, but upon which is formed a first inductive magnetic pole layer 28 separated from a second inductive magnetic pole layer 32 by a third insulator layer 30, thus forming a dual stripe magnetoresistive (DSMR) read-write head. Methods and materials through which inductive magnetic pole layers may be formed within dual stripe magnetoresistive (DSMR) read-write heads are known in the art of dual stripe magnetoresistive (DSMR) read-write head fabrication. Methods and materials through which inductive magnetic pole layers may be formed within dual stripe magnetoresistive (DSMR) read-write heads typically include but are not limited to plating methods, chemical vapor deposition (CVD) methods, plasma enhanced chemical vapor deposition (PECVD) methods and physical vapor deposition (PVD) sputtering methods through which may be formed inductive magnetic pole layers of soft magnetic materials including but not limited to of nickel-iron (Ni—Fe) alloys, iron-aluminum-silicon (Fe—Al—Si) alloys, cobalt (Co) base alloys and composites of nickel-iron (Ni—Fe) alloys, iron-aluminum-silicon (Fe—Al—Si) alloys and cobalt (Co) base alloys. For the preferred embodiment of the present invention, the first inductive magnetic pole layer 28 and the second inductive magnetic pole layer 32 are both preferably formed of a soft magnetic material chosen from the group of soft magnetic materials consisting of nickel,iron (Ni—Fe) alloys, iron-aluminum-silicon (Fe—Al—Si) alloys, cobalt (Co) base alloys and composites of nickel-iron (Ni—Fe) alloys, iron-aluminum-silicon (Fe—Al—Si) alloys and cobalt (Co) base alloys, typically although not exclusively deposited through a physical vapor deposition (PVD) sputtering method to form the first inductive magnetic pole layer 28 and the second inductive magnetic pole layer 32 each of a thickness from about 0.5 to about 5.0 microns. Preferably, the first inductive magnetic pole layer 28 and the second inductive magnetic pole layer 32 are formed of a width horizontally over the substrate 10 such that the write track width of the dual stripe magnetoresistive (DSMR) read-write head does not compromise the read back width of the dual stripe magnetoresistive (DSMR) read-write head.

Similarly with the first insulator layer 18 and the second insulator layer 26, for the preferred embodiment of the present invention the third insulator layer 32 is preferably formed through methods and materials analogous or equivalent to the methods and materials employed in forming the first insulator layer 18 and the second insulator layer 26. Preferably, the third insulator layer 30 separates the first inductive magnetic pole layer 28 and the second inductive magnetic pole layer 32 by a thickness (ie: separation distance) of from about 100 to about 1000 angstroms.

Upon forming the dual stripe magnetoresistive (DSMR) read-write head whose schematic plan-view diagram is illustrated in FIG. 5, there is formed a dual stripe magnetoresistive (DSMR) read-write head whose read back width is varied as a function of the electromagnetic bias current magnitude and direction of the patterned first magnetoresistive layer 12 and the patterned second magnetoresistive layer 20.

As is understood by a person skilled in the art, the preferred embodiment of the dual stripe magnetoresistive (DSMR) sensor element or dual stripe magnetoresistive (DSMR) read-write head may include several other layers in addition to those illustrated within FIG. 1 to FIG. 5. Such other layers may include, but are not limited to shield layers, coil layers, passivation layers, conductive connection/ interconnection layers, resin layers, overcoating layers and terminations layers. Such other layers may be formed in locations within the dual stripe magnetoresistive (DSMR) sensor element or dual stripe magnetoresistive (DSMR) read-write head of the present invention where those layers would conventionally be expected to be formed.

EXAMPLE

A dual stripe magnetoresistive (DSMR) sensor element was fabricated upon a substrate in accord with the preferred embodiment of the present invention. The dual stripe magnetoresistive (DSMR) sensor element was formed upon an alumina-titanium carbide substrate through photolithographic and etching methods as are conventional in the art. Within the dual stripe magnetoresistive (DSMR) sensor element was formed a patterned first magnetoresistive layer of thickness about 175 angstroms and a patterned second magnetoresistive layer of thickness about 175 angstroms. Each of the patterned first magnetoresistive layer and the patterned second magnetoresistive layer was formed of a permalloy (ie: nickel-iron 80:20) alloy. The patterned first magnetoresistive layer and the patterned second magnetoresistive layer were separated by an insulator layer formed from aluminum oxide deposited at a thickness of about 400 angstroms. Each of the patterned first magnetoresistive layer and the patterned second magnetoresistive layer had a sensor region of width about 2.0 microns defined by a pair of patterned anti-ferromagnetic longitudinal magnetic biasing layers formed of a nickel-manganese alloy at a thickness of about 200 angstroms each upon which in turn were formed and aligned a pair of patterned conductor lead layers formed of gold at a thickness of about 500 angstroms each.

The pairs of patterned anti-ferromagnetic longitudinal magnetic biasing layers formed upon the first magnetoresistive (MR) layer and the second magnetoresistive (MR) layer were formed in a fashion such that the first magnetoresistive (MR) layer and the second magnetoresistive (MR) layer were anti-ferromagnetically longitudinally magnetically biased substantially parallel, within the context of the method which was employed in forming the pairs of patterned anti-ferromagnetic longitudinal magnetic biasing layers. The strength of the anti-ferromagnetic longitudinal magnetic bias field for each of the first magnetoresistive (MR) layer and the second magnetoresistive (MR) layer was about 50 oersteds. The two magnetoresistive layers having the nominal equivalent track widths of about 2.0 microns each had a horizontal width upon the substrate of about 20 microns. Additionally, the two magnetoresistive layers were horizontally offset by a distance of about 0.2 microns.

The substrate upon which was formed the dual stripe magnetoresistive sensor element was then fabricated into a slider assembly employed within a direct access storage device (DASD) magnetic data storage enclosure. The signal amplitudes for each of the two magnetoresistive (MR) layers within the dual stripe magnetoresistive (DSMR) sensor element were then measured with respect to a standard magnetic flux signal within a magnetic data storage disk within the direct access storage device (DASD) magnetic data storage enclosure. The signal amplitudes were measured as a function of the positioning of the magnetoresistive (MR) sensor element with respect to the standard magnetic flux signal. The signal amplitude measurements were obtained at an electromagnetic bias current direction for both the first magnetoresistive (MR) layer and the second magnetoresistive (MR) layer either parallel or anti-parallel to the anti-ferromagnetic longitudinal magnetic bias direction for both the first magnetoresistive (MR) layer and the second magnetoresistive (MR) layer. The signal amplitudes were then normalized and plotted to yield the graphs of FIG. 6a (8 milli-amperes electromagnetic bias current in bias current directions parallel to anti-ferromagnetic longitudinal magnetic exchange bias directions) (where curve 40 represents the signal amplitude from the first magnetoresistive (MR) layer and curve 42 represents the signal amplitude from the second magnetoresistive (MR) layer) and FIG. 6b (8 milli-amperes electromagnetic bias current in bias current directions anti-parallel to the anti-ferromagnetic longitudinal magnetic exchange bias directions) (where curve 44 represents the signal amplitude from the first magnetoresistive (MR) layer and curve 46 represents the signal amplitude from the second magnetoresistive (MR) layer).

Figure 6A:
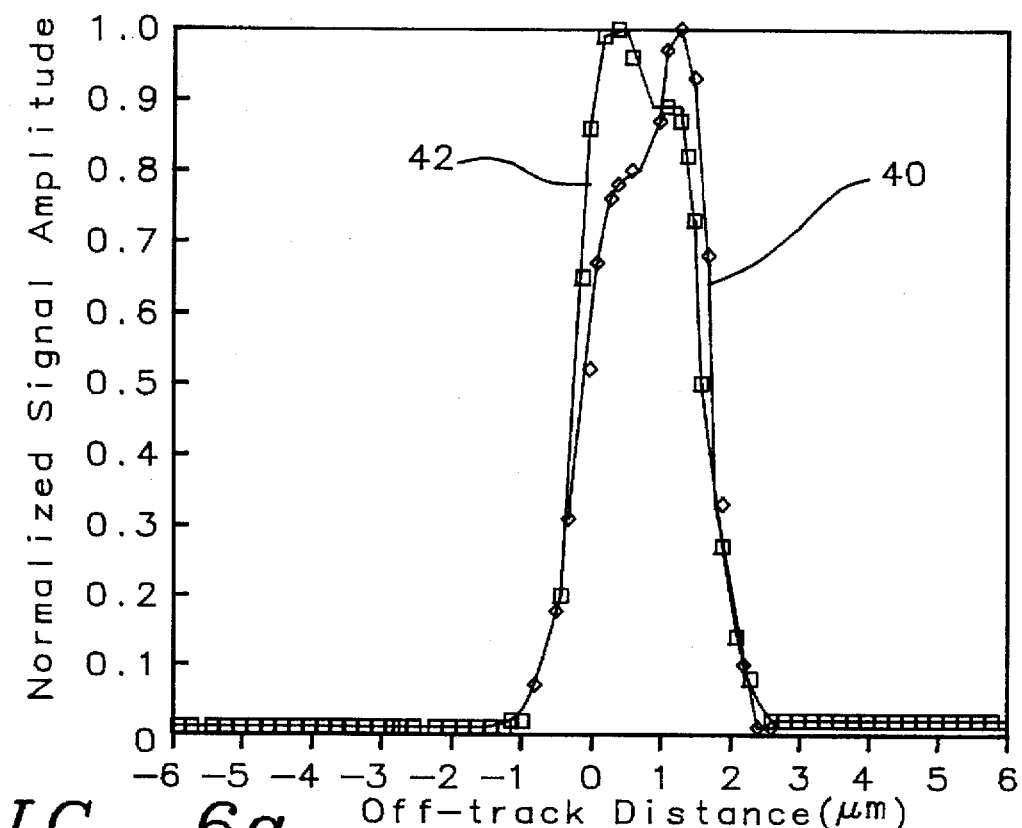
FIG. 6a and FIG. 6b show a pair of plots of Signal Amplitude versus Off-Track Distance for the dual stripe magnetoresistive sensor elements whose schematic plan-view diagrams are illustrated in FIG. 3a and FIG. 3b.
Figure 6B:
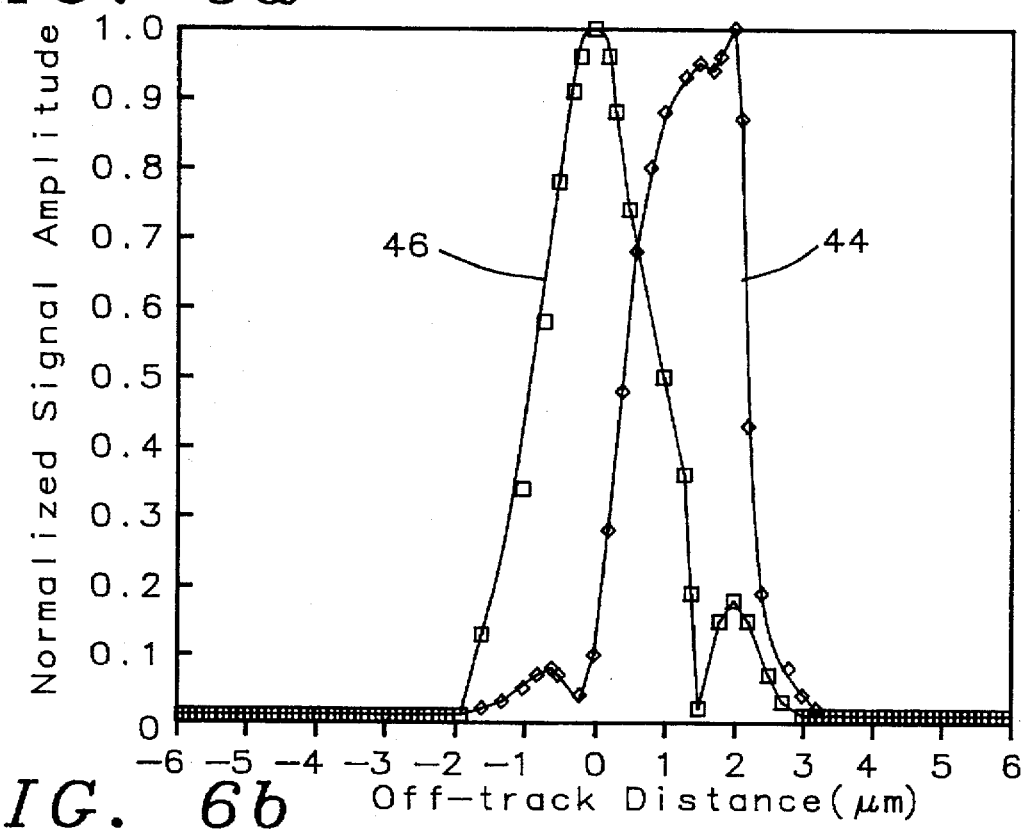

As is seen from review of the graphical data of FIG. 6a and FIG. 6b, the effective composite read back width of the dual stripe magnetoresistive (DSMR) sensor element is about 1.9 microns when the first magnetoresistive (MR) layer and the second magnetoresistive (MR) layer are longitudinally magnetically biased in a direction substantially parallel with the electromagnetic current bias directions, while the effective composite read back width of the dual stripe magnetoresistive (DSMR) sensor element is about 2.5 microns when the first magnetoresistive (MR) layer and the second magnetoresistive (MR) layer are both longitudinally magnetically biased in a direction substantially anti-parallel with the electromagnetic current bias directions. From this reduction of read back width it is inferred that there may be obtained a decrease in track spacing within a magnetic data storage disk of about 15 percent while providing a dual stripe magnetoresistive (DSMR) read-write head with a functional signal to noise ratio.

As is understood by a person skilled in the art, the preferred embodiment and EXAMPLE of the dual stripe magnetoresistive (DSMR) sensor element and dual stripe magnetoresistive (DSMR) read-write head of the present invention are illustrative of the dual stripe magnetoresistive (DSMR) sensor element and dual stripe magnetoresistive (DSMR) read-write head of the present invention rather than limiting of the dual stripe magnetoresistive (DSMR) sensor element and dual strip magnetoresistive (DSMR) read-write head of the present invention. Revisions may be made to methods, materials, structures and dimensions through which is formed the dual stripe magnetoresistive (DSMR) sensor element and dual stripe magnetoresistive (DSMR) read-write head of the present invention while still forming a dual stripe magnetoresistive (DSMR) sensor element or a dual strip magnetoresistive (DSMR) read-write head in accord with the present invention, as defined by the accompanying claims.

What is claimed is:

1. A method for forming a dual stripe magnetoresistive (DSMR) sensor element comprising:

forming a first magnetoresistive (MR) layer over a substrate, the first magnetoresistive (MR) layer having a first sensor region longitudinally magnetically biased in a first longitudinal bias direction through a patterned first longitudinal magnetic biasing layer;

forming a second magnetoresistive (MR) layer parallel with and separated from the first magnetoresistive (MR) layer by an insulator layer, the second magnetoresistive (MR) layer having a second sensor region longitudinally magnetically biased in a second longitudinal bias direction through a patterned second longitudinal magnetic biasing layer, where the first longitudinal bias direction and the second longitudinal bias direction are substantially parallel and where the first sensor region and the second sensor region are physically offset; and electromagnetically biasing the first magnetoresistive layer with a first bias current in a first bias current direction and electromagnetically biasing the second magnetoresistive layer with a second bias current in a second bias current direction, where the first bias current direction and the second bias current direction are substantially parallel.

2. The method of claim 1 wherein the patterned first longitudinal magnetic biasing layer provides to the first magnetoresistive (MR) layer a longitudinal magnetic bias of from about 10 to about 1000 oersteds and the patterned second longitudinal magnetic biasing layer provides to the second magnetoresistive (MR) layer a longitudinal magnetic bias of from about 10 to about 1000 oersteds.

3. The method of claim 2 wherein the first bias current is from about 2 to about 20 milli-amperes and the second bias current is from about 2 to about 20 milli-amperes.

4. The method of claim 1 wherein:

the first sensor region has a width of from about 0.3 to about 5 microns;

the second sensor region has a width of from about 0.3 to about 5 microns; and the physical offset is from about 0.1 to about 2 microns.

5. The method of claim 1 further comprising forming over the substrate a first inductive magnetic pole layer separated from a second magnetic pole layer by a second insulator layer, thus forming the dual stripe magnetoresistive (MR) sensor element into a dual stripe magnetoresistive (MR) read-write head.

6. A dual stripe magnetoresistive (DSMR) sensor element comprising:

a first magnetoresistive (MR) layer formed over a substrate, the first magnetoresistive (MR) layer having a first sensor region longitudinally magnetically biased in a first longitudinal bias direction through a patterned first longitudinal magnetic biasing layer;

a second magnetoresistive (MR) layer parallel with and separated from the first magnetoresistive (MR) layer by an insulator layer, the second magnetoresistive (MR) layer having a second sensor region longitudinally magnetically biased in a second longitudinal bias direction through a patterned second longitudinal magnetic biasing layer, wherein:

the first longitudinal bias direction and the second longitudinal bias direction are substantially parallel;

the first sensor region and the second sensor region are physically offset; and the first magnetoresistive layer is electromagnetically biased with a first bias current in a first bias current direction and the second magnetoresistive layer is electromagnetically biased with a second bias current in a second bias current direction, where the first bias current direction and the second bias current direction are substantially parallel.

7. The dual stripe magnetoresistive (DSMR) sensor element of claim 6 wherein the patterned first longitudinal magnetic biasing layer provides to the first magnetoresistive (MR) layer a longitudinal magnetic bias of from about 10 to about 1000 oersteds and the patterned second longitudinal magnetic biasing layer provides to the second magnetoresistive (MR) layer a longitudinal magnetic bias of from about 10 to about 1000 oersteds.

8. The dual stripe magnetoresistive (DSMR) sensor element of claim 6 wherein:

the first sensor region has a width of from about 0.3 to about 5 microns;

the second sensor region has a width of from about 0.3 to about 5 microns; and the physical offset is from about 0.1 to about 2 microns.

9. The dual stripe magnetoresistive (DSMR) sensor element of claim 8 wherein the first bias current is from about 2 to about 20 milli-amperes and the second bias current is from about 2 to about 20 milli-amperes.

10. The dual stripe magnetoresistive (DSMR) sensor element of claim 6 further comprising a first inductive magnetic pole layer separated from a second magnetic pole layer by a second insulator layer, the first magnetic pole layer, the second magnetic pole layer and the second insulator layer being formed over the substrate, thus forming the dual stripe magnetoresistive (MR) sensor element into a dual stripe magnetoresistive (MR) read-write head.

11. A method for forming a dual stripe magnetoresistive (DSMR) sensor element with reduced read back width comprising:

forming a first magnetoresistive (MR) layer over a substrate, the first magnetoresistive (MR) layer having a first sensor region longitudinally magnetically biased in a first longitudinal bias direction through a patterned first longitudinal magnetic biasing layer;

forming a second magnetoresistive (MR) layer parallel with and separated from the first magnetoresistive (MR) layer by an insulator layer, the second magnetoresistive (MR) layer having a second sensor region longitudinally magnetically biased in a second longitudinal bias direction through a patterned second longitudinal magnetic biasing layer, where the first longitudinal bias direction and the second longitudinal bias direction are substantially parallel and where the first sensor region and the second sensor region are physically offset; and electromagnetically biasing the first magnetoresistive layer with a first bias current in a first bias current direction and electromagnetically biasing the second magnetoresistive layer with a second bias current in a second bias current direction, where the first bias current direction and the second bias current direction are substantially parallel with the first longitudinal bias direction and the second longitudinal bias direction.

12. The method of claim 11 wherein the patterned first longitudinal magnetic biasing layer provides to the first magnetoresistive (MR) layer a longitudinal magnetic bias of from about 10 to about 1000 oersteds and the patterned second longitudinal magnetic biasing layer provides to the second magnetoresistive (MR) layer a longitudinal magnetic bias of from about 10 to about 1000 oersteds.

13. The method of claim 11 wherein:

the first sensor region has a width of from about 0.3 to about 5 microns;

the second sensor region has a width of from about 0.3 to about 5 microns; and the physical offset is from about 0.1 to about 2 microns.

14. The method of claim 13 wherein the first bias current is from about 2 to about 20 milli-amperes and the second bias current is from about 2 to about 20 milli-amperes.

15. The method of claim 11 further comprising forming over the substrate a first inductive magnetic pole layer separated from a second magnetic pole layer by a second insulator layer, thus forming the dual stripe magnetoresistive (MR) sensor element into a dual stripe magnetoresistive (MR) read-write head.

16. A dual stripe magnetoresistive (DSMR) sensor element formed in accord with the method of claim 11.

* * * * *